(12) United States Patent
Rhee et al.

(10) Patent No.: US 10,691,333 B2
(45) Date of Patent: Jun. 23, 2020

(54) METHOD AND APPARATUS FOR INPUTTING CHARACTER

(71) Applicant: Samsung Electronics Co., Ltd., Suwon-si, Gyeonggi-do (KR)

(72) Inventors: Taik-heon Rhee, Seoul (KR); Myung-sik Kim, Suwon-si (KR); Kwang-min Byeon, Dangjin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 822 days.

(21) Appl. No.: 14/824,483

(22) Filed: Aug. 12, 2015

(65) Prior Publication Data

US 2016/0048297 A1 Feb. 18, 2016

(30) Foreign Application Priority Data

Aug. 14, 2014 (KR) .................. 10-2014-0106224

(51) Int. Cl.
*G06F 3/0488* (2013.01)

(52) U.S. Cl.
CPC ...... *G06F 3/04886* (2013.01); *G06F 3/04883* (2013.01)

(58) Field of Classification Search
CPC ................................................ G06F 3/04886
See application file for complete search history.

(56) References Cited

U.S. PATENT DOCUMENTS

| | | | |
|---|---|---|---|
| 5,793,692 A | 8/1998 | Merritt et al. | |
| 10,055,103 B1* | 8/2018 | Ozuysal | G06F 3/04883 |
| 2007/0296704 A1 | 12/2007 | Park et al. | |
| 2009/0104943 A1 | 4/2009 | Park et al. | |
| 2011/0095986 A1 | 4/2011 | Aono et al. | |
| 2012/0054672 A1* | 3/2012 | McDowell | G09B 17/003 715/784 |
| 2012/0096409 A1* | 4/2012 | Chen | G06F 3/04886 715/843 |
| 2012/0102304 A1* | 4/2012 | Brave | G06F 17/30867 713/1 |
| 2014/0157126 A1* | 6/2014 | Kusano | G06F 3/0236 715/716 |
| 2014/0201671 A1* | 7/2014 | Zhai | G06F 3/04886 715/773 |
| 2016/0349957 A1* | 12/2016 | Lee | G06F 3/0482 |

FOREIGN PATENT DOCUMENTS

KR 10-2009-0039206 A 4/2009

* cited by examiner

*Primary Examiner* — Beau D Spratt
(74) *Attorney, Agent, or Firm* — Jefferson IP Law, LLP

(57) ABSTRACT

A method of inputting a character is provided. The method includes receiving a user input for inputting a character, obtaining a plurality of candidate characters corresponding to the user input, sequentially converting the plurality of candidate characters into a selectable character state whenever a predetermined character conversion cycle ends, updating a character conversion cycle based on an amount of time it takes to sequentially convert the plurality of candidate characters into the selectable character state, before a user input for selecting a selectable character is received, and sequentially converting the plurality of candidate characters into the selectable character state whenever the updated character conversion cycle ends.

13 Claims, 12 Drawing Sheets

1103

1105

METHOD AND APPARATUS FOR INPUTTING CHARACTER

CROSS-REFERENCE TO RELATED APPLICATION(S)

This application claims the benefit under 35 U.S.C. § 119(a) of a Korean patent application filed on Aug. 14, 2014 in the Korean Intellectual Property Office and assigned Serial number 10-2014-0106224, the entire disclosure of which is hereby incorporated by reference.

TECHNICAL FIELD

The present disclosure relates to a method and apparatus for inputting a desired character. More particularly, the present disclosure relates to a method and apparatus for inputting a character while controlling a character conversion cycle defined as a time interval at which candidate characters are converted into a character-selectable state.

BACKGROUND

Recently, mobile terminals have evolved into multimedia devices capable of providing various additional services such as a digital organizer function, a game function, a schedule management function, etc. As the mobile terminals have been developed to provide various additional services, it is indispensable to allow users to input various types of characters. Thus, various methods have been introduced to enable users to more conveniently input information, and particularly, characters.

If a plurality of characters is assigned to one key or a touch region of a mobile terminal, a character that a user desires to input should be selected from among the plurality of characters when the user selects the key. Thus, there is a need to develop a method of enabling a user to input a desired character in an easy and simple manner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for inputting a desired character.

Additional aspects will be set forth in part in the description which follows and, in part, will be apparent from the description, or may be learned by practice of the various embodiments of the present disclosure.

In accordance with an aspect of the present disclosure, a method of inputting a character is provided. The method includes receiving a user input for inputting a character, obtaining a plurality of candidate characters corresponding to the user input, sequentially converting the plurality of candidate characters into a selectable character state whenever a predetermined character conversion cycle ends, updating the predetermined character conversion cycle based on an amount of time it takes to sequentially convert the plurality of candidate characters into the selectable character state, before a user input for selecting a selectable character is received, and sequentially converting the plurality of candidate characters into the selectable character state whenever the updated character conversion cycle ends.

When an iterative round in which the plurality of candidate characters are sequentially converted into the selectable character state is repeated, the updating of the character conversion cycle may include updating the character conversion cycle whenever the iterative round starts.

Before the user input for selecting a selectable character is received, the updating of the character conversion cycle may include updating the character conversion cycle whenever the iterative round starts, based on a number of times that the iterative round is repeated or the amount of time it takes to sequentially convert the plurality of candidate characters into the selectable character state.

The user input for inputting a character may be a touch input. While the touch input is held, the plurality of candidate characters may be sequentially converted into the selectable character state whenever the character conversion cycle ends. When the touch input is ended, a character that is selectable at a point in time when the touch input is ended may be selected and input.

The method may further include receiving a drag input while the touch input is held, and determining, based on the drag input, at least one of the character conversion cycle and a character conversion direction representing an order in which the candidate characters are converted into the selectable character state.

The method may further include selecting and inputting the selectable character, and updating the character conversion cycle based on at least one of whether the selected and input character is to be deleted and an amount of time it takes to select and input the selectable character, starting from a predetermined point in time.

The updating of the character conversion cycle may include decreasing the character conversion cycle, based on at least one of a case in which the selected and input character is not deleted and a case in which the amount of time it takes to select and input the selectable character starting from a predetermined point in time is less than a reference value.

The updating of the character conversion cycle may include increasing the character conversion cycle, based on at least one of a case in which the selected and input character is deleted and a case in which the amount of time it takes to select and input the selectable character starting from a predetermined point in time is equal to or greater than a reference value.

In accordance with another aspect of the present disclosure, an apparatus for inputting a character is provided. The apparatus includes a user input unit configured to receive a user input for inputting a character, and a controller configured to obtain a plurality of candidate characters corresponding to the user input, to sequentially convert the plurality of candidate characters into a selectable character state whenever a predetermined character conversion cycle ends, to update the predetermined character conversion cycle based on an amount of time it takes to sequentially convert the plurality of candidate characters into the selectable character state, before a user input for selecting a selectable character is received, and to sequentially convert the plurality of candidate characters into the selectable character state whenever the updated character conversion cycle ends.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
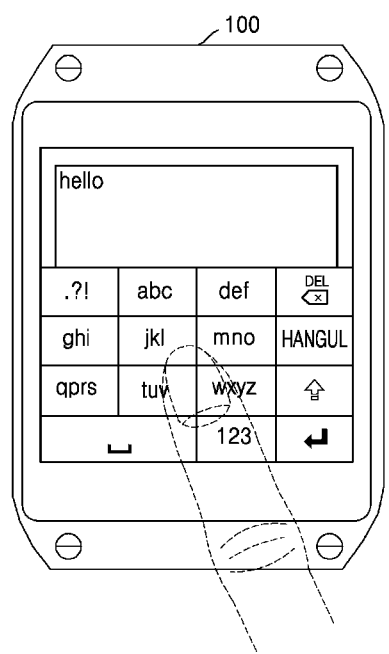
FIG. 1 illustrates a character inputting apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before various embodiments are described in detail, the terminology used in the present disclosure will be briefly described.

In the present disclosure, general terms that have been widely used nowadays are selected, if possible, in consideration of functions of the inventive concept, but non-general terms may be selected according to the intentions of technicians in the this art, precedents, or new technologies, etc. Also, some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the inventive concept.

It will be understood that the terms "comprise" and/or "comprising" when used in this specification, specify the presence of stated features, integers, operations, elements, and/or components, but do not preclude the presence or addition of one or more other features, integers, operations, elements, components, and/or groups thereof. Also, the terms "unit", "module", etc. mean units for processing at least one function or operation and may be embodied as hardware, software, or a combination thereof.

In the present disclosure, the term "touch input" means a user's gesture performed on a touch screen to control a device, etc. Examples of a touch input described herein include 'tap', 'touch & hold', 'double-tap', 'drag', 'pan', 'flick', 'drag-and-drop', 'pinch', 'swipe', etc.

The term "tap" means touching a screen with a user's finger or a touch tool (e.g., an electronic pen) and lifting the user's finger or the touch tool from the screen while the screen is touched with the user's finger or the touch tool.

The term "touch & hold" means touching a screen with a user's finger or a touch tool (e.g., an electronic pen) and maintaining the user's finger or touch tool in a touching state on the screen for a threshold time (e.g., 2 seconds) or more. For example, the term "touch & hold" may be understood to mean that a time period between a touch-in time point and a touch-out time point is a threshold time (e.g., 2 seconds) or more. A visual, audio, or tactile feedback signal may be provided when a touch input is maintained for the threshold time or more so that a user may recognize whether the touch input is a tap input or a touch & hold input. The threshold time is variable according to an embodiment.

The term "double tap" means touching a screen twice with a user's finger or a touch tool (e.g., an electronic pen).

The term "drag" means touching a location on a screen with a user's finger or a touch tool and moving the user's finger or the touch tool to another location on the screen while the screen is touched with the user's finger or the touch tool. When dragging is performed, an object is moved on the screen or panning, which will be described below, is performed.

The term "panning" means performing dragging without selecting an object. When panning is performed, an object is not selected and is thus not moved within a page. Instead, a page is moved within a screen or a group of objects are moved within a page.

The term "flick" means performing dragging with a user's finger or a touch tool at a threshold speed (e.g., 100 pixel/s) or more. Whether a touch input is a drag input (or a pan input) or flicking may be determined based on whether a moving speed of the user's finger or the touch tool is equal to or greater than the threshold speed, e.g., 100 pixel/s).

The term "drag & drop" means dragging an object to a desired position on a screen with a user's finger or a touch tool and lifting the user's finger or the touch tool from the screen.

The term "pinch" means touching a screen with a user's two fingers and moving the fingers in different directions while the screen is touched. Pinching is a gesture of pinching open/close an object or a page. A pinch-open value or a pinch-out value is determined by the distance between the two fingers.

The term "swipe" means touching an object on a screen with a user's finger or a touch tool and moving the object to a desired distance while the object is touched. However, such a movement in a diagonal direction may not be recognized as a swipe.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a character inputting apparatus 100 according to an embodiment of the present disclosure.

According to an embodiment of the present disclosure, the character inputting apparatus 100 may be a terminal apparatus configured to input a character according to user input. In the present disclosure, examples of the character inputting apparatus 100 include, but are not limited to, a mobile phone, a smart phone, a laptop computer, a tablet personal computer (PC), an electronic book terminal, a digital broadcast terminal, a personal digital assistant (PDA), a portable multimedia player (PMP), a navigation system, a Moving Picture Experts Group phase 1 or phase 2 (MPEG-1 or MPEG-2) audio layer 3 (MP3) player, a digital camera, a wearable device (such as glasses, a wrist watch, a ring, etc.), a television (TV) remote control, etc.

Throughout the present disclosure, characters to be input by the character inputting apparatus 100 may include, but are not limited to, consonants and vowels of Hangul, i.e., the Korean alphabet, other alphabets, numbers, signs, etc., that may be input by a user, and may further include emoticons, images, stickers, icons, etc.

Thus, in a method of inputting a character according to an embodiment of the present disclosure, not only characters but also contents such as emoticons, images, stickers, etc., or texts may be input according to user input. In other words, in a method of inputting a character according to an embodiment of the present disclosure, one selected from among a plurality of candidate contents or texts corresponding to user input may be finally input. For convenience of explanation, various embodiments will be hereinafter described with respect to inputting a character.

Referring to FIG. 1, the character inputting apparatus 100 may include a character input button for inputting a character according to a user input and a display screen for displaying an input character. The character input button displayed on the display screen may be a soft button that may be input in various ways, e.g., via a touch input or a motion input. The character input button is, however, not limited thereto and may be a hard button or an input key pad installed outside the display screen.

The character input button does not need to be installed in the character inputting apparatus 100 or to be output via the display screen or using. An input of the character input button may be received in various ways such as a voice input or a motion input.

With the character inputting apparatus 100, a character may be input by receiving a user's touch input performed on the character input button displayed on the display screen. The character inputting apparatus 100 may display the input character on a display screen.

According to an embodiment of the present disclosure, a plurality of characters may be assigned to each of character input buttons of the character inputting apparatus 100, and one of the assigned characters may be selected and input according to user input.

If a plurality of characters is assigned to one character input button, a process of selecting a character that a user wants to input from among the plurality of characters should be performed when the user inputs the character input button. In the character inputting apparatus 100 according to an embodiment of the present disclosure, whenever a character conversion cycle ends, a plurality of candidate characters corresponding to the character input buttons may be converted into a selectable character state so that a character that is selectable at a point in time when a user input is received may be input. In other words, when a user input for selecting a character to be input from among the candidate characters is received, the character inputting apparatus 100 may input a character that is selectable at the point in time when the user input is received.

For example, the character inputting apparatus 100 may sequentially convert, into the selectable character state, a plurality of candidate characters corresponding to a button for which a touch input is received while the touch input is held. When the touch input is ended, the character inputting apparatus 100 may finally input a character that is selectable at a point in time that the touch input is ended.

Whenever the character conversion cycle ends, the plurality of candidate characters may be converted into the selectable character state. A speed at which the plurality of candidate characters is converted may be determined by the character conversion cycle. A user may finally input a desired character when the desired character is converted into the selectable character state according to the character conversion cycle among candidate characters to be converted.

A plurality of candidate characters and a character converted into the selectable character state may be displayed on the display screen or output in various ways, e.g., using vibration or voice. Thus, a user may check the candidate characters and the selectable character and select a desired character from among them. For example, when a selectable character is 'a', the selectable character may be output in the form of voice 'ei' or in the form of vibration or pressure corresponding thereto. The outputting of the selectable character may be understood as applying pressure onto a part of a body that is in contact with the character inputting apparatus 100. For example, when either the character inputting apparatus 100 or a device through which a signal corresponding to an operation of the character inputting apparatus 100 is output is a smart watch, the character inputting apparatus 100 may output the selectable character by applying pressure at a location thereof that is in contact with a user's wrist.

In addition, when the selectable character is finally input according to a user input, the input character may be displayed on the display screen or output in various ways, e.g., using vibration, voice, etc. That is, the character inputting apparatus 100 may output a notice indicating whether a character is finally input or the finally input character.

The character inputting apparatus 100 may update the character conversion cycle, based on an amount of time it takes to sequentially convert a plurality of candidate characters into the selectable character state, taking into account a case in which a user is inexperienced in selecting a character to be input among characters converted in the character conversion cycle. In other words, the character inputting apparatus 100 may determine that a user is inexperienced in selecting a character converted in the character conversion cycle when an amount of time it takes to convert characters in the character conversion cycle is long before user input for selecting a character is received. When a user seems to be inexperienced in selecting a character converted in the character conversion cycle, the character inputting apparatus 100 may increase the character conversion cycle to easily input user input.

According to an embodiment of the present disclosure, after a touch input is received, the character inputting apparatus 100 may sequentially convert a plurality of candidate characters into the selectable character state while the touch input is held. When the touch input is continuously held for a predetermined time, the character inputting apparatus 100 may determine that a user is inexperienced in selecting a character in the character conversion cycle, and increase the character conversion cycle. When the character conversion cycle increases, a speed at which each of the plurality of candidate characters is converted into the selectable character state decreases. Thus, the user may be able to more easily select and input a desired character when the desired character is converted into the selectable character state.

A method of inputting a character using the character inputting apparatus 100 will be described in more detail with reference to FIG. 2 below.

Figure 2:
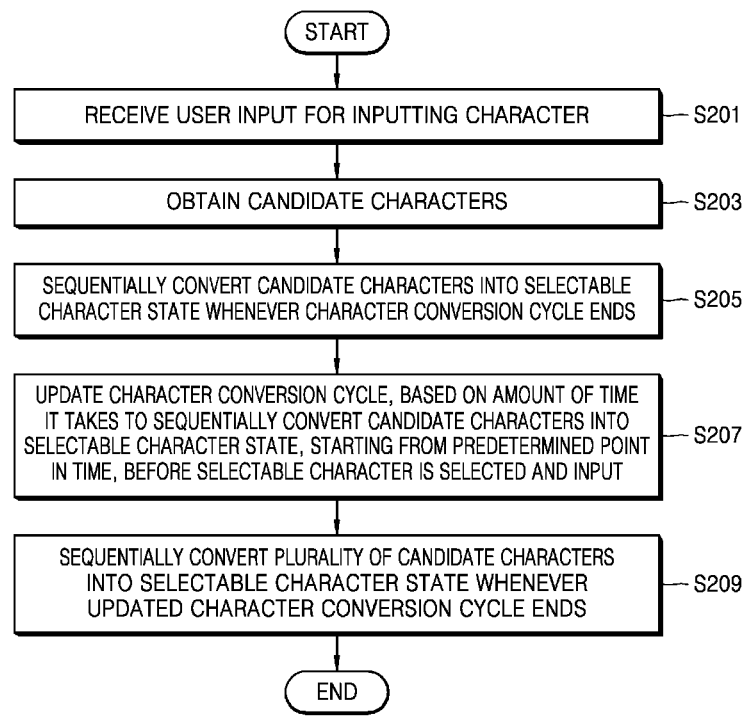
FIG. 2 is a flowchart of a method of inputting a character according to an embodiment of the present disclosure.

FIG. 2 is a flowchart of a method of inputting a character according to an embodiment of the present disclosure.

Referring to FIGS. 1 and 2, in operation S201, the character inputting apparatus 100 may receive user input for inputting a character. For example, the character inputting apparatus 100 may receive user input through a touch input performed on a character input button displayed on a touch screen or through a key input performed on a key button for inputting a character. The character inputting apparatus 100 is, however, not limited thereto and may receive user input for inputting a character in various ways, e.g., through a voice input, a motion input, etc.

In operation S203, the character inputting apparatus 100 may obtain a plurality of candidate characters corresponding to the user input received in operation S201. When a plurality of candidate characters are assigned to a character input button for which user input is received, the character inputting apparatus 100 may obtain the plurality of candidate characters to finally input one of them.

In operation S205, in order to select a character to be input from among the plurality of candidate characters, the character inputting apparatus 100 may sequentially convert the plurality of candidate characters obtained in operation S203 into a selectable character state whenever a character conversion cycle ends.

According to an embodiment of the present disclosure, the character inputting apparatus 100 may output a selectable character to a user so that the user may be able to select and input a desired character. For example, the character inputting apparatus 100 may sequentially display, on the plurality of candidate characters displayed on a display, a mark indicating that a current character is selectable whenever the character conversion cycle ends. Otherwise, the character inputting apparatus 100 may display a selectable character in a different color or a different background color than the colors or the background colors of the other candidate characters.

The character conversion cycle may be understood as a time period in which each of the plurality of candidate characters is in the selectable character state. The character conversion cycle may be set according to user input or automatically set based on a result of learning a user's character input history. The character conversion cycle is, however, not limited thereto and may be determined in various ways.

The character inputting apparatus 100 according to an embodiment may update the character conversion cycle based on a user's history of manipulation for inputting a character. In other words, the character inputting apparatus 100 may automatically determine the character conversion cycle according to the user's manipulation history based on which whether the user is experienced in inputting a character may be determined.

In operation S207, before a selectable character is selected and input, the character inputting apparatus 100 may update the character conversion cycle, based on an amount of time it takes to sequentially convert candidate characters into the selectable character state, starting from a predetermined point in time. In other words, before a character to be input is selected from among the plurality of candidate characters, the character inputting apparatus 100 may update the character conversion cycle, based on the amount of time it takes to convert each of the plurality of candidate characters.

When the amount of time it takes to convert candidate characters is long, the character inputting apparatus 100 may determine that a user is inexperienced in inputting a character, and update the character conversion cycle to be increased. When the character conversion cycle increases, a speed at which the candidate characters are converted into the selectable character state may decrease. Since a user should input a desired character when the desired character is converted into the selectable character state, the user may be able to more easily input the desired character when the speed at which the candidate characters are converted into the selectable character state decreases. However, when the speed at which the candidate characters are converted into the selectable character state is low, a speed at which a character is input is also low. Thus, the character inputting apparatus 100 may automatically update the character conversion cycle by determining an optimum character conversion cycle based on the user's history of manipulation for inputting a character.

In contrast, when the amount of time it takes to convert candidate characters is short, the character inputting apparatus 100 may update the character conversion cycle to be decreased, before user input for selecting a selectable character is received. After user input for selecting a selectable character is received and the selectable character is input, the character inputting apparatus 100 may calculate the amount of time it takes and thus update the character conversion cycle after the selectable character is input.

In operation S209, the character inputting apparatus 100 may sequentially convert the plurality of candidate characters into the selectable character state whenever the character conversion cycle updated in operation S207 ends. The character inputting apparatus 100 may sequentially convert the plurality of candidate characters into the selectable character state in the candidate character cycle updated in operation 207, until one of the plurality of candidate characters is selected and input.

Figure 3:
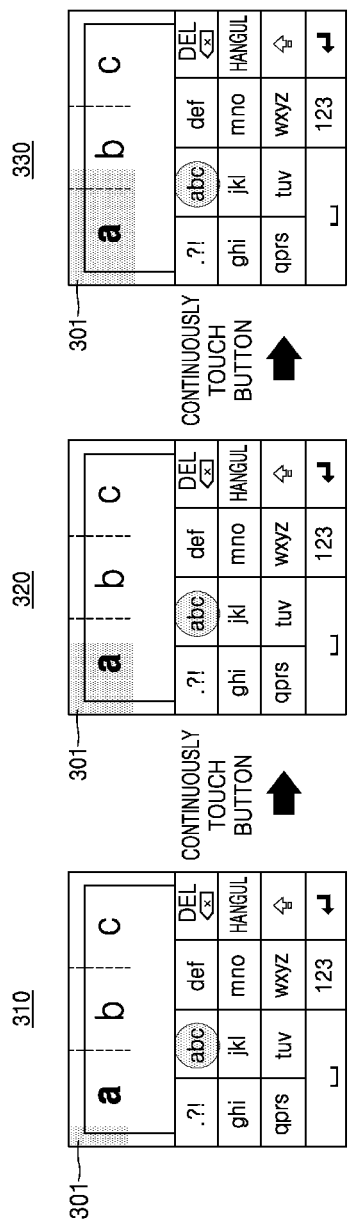
FIGS. 3 and 4 are diagrams illustrating conversion of the states of a plurality of candidate characters into a selectable character state according to various embodiments of the present disclosure.
Figure 4:
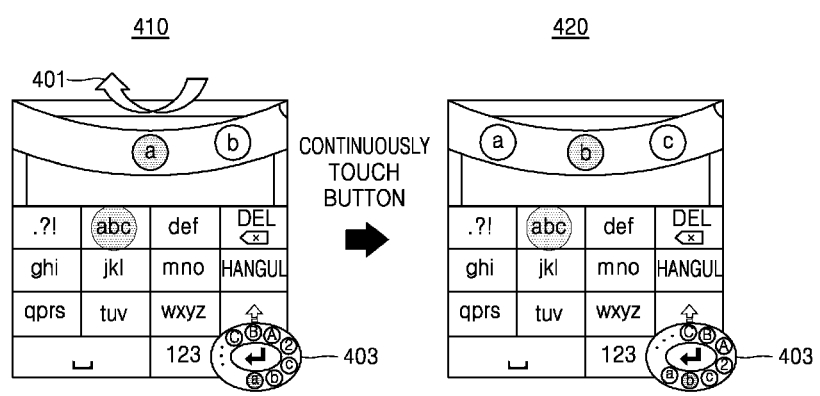

FIGS. 3 and 4 are diagrams illustrating displaying conversion of the states of a plurality of candidate characters into a selectable character state according to various embodiments of the present disclosure. In particular, FIG. 3 illustrates displaying, in the form of a progress bar, conversion of the states of a plurality of candidate characters into the selectable character state according to an embodiment of the present disclosure. FIG. 4 illustrates displaying, in a roulette form, conversion of the states of a plurality of candidate characters into the selectable character state according to another embodiment of the present disclosure.

Referring to FIGS. 1 and 3, when a character input is received, the character inputting apparatus 100 may display display screens 310 to 330. In the display screen 310, when a button assigned characters a, b, and c is input, the characters a, b, and c which are candidate characters may be displayed on an upper region of the display screen 310. As the button assigned the characters a, b, and c is continuously input, a progress bar 301 may be moved while an area thereof is increased. A speed at which the progress bar 301 is moved may be determined by a character conversion cycle. That is, when the character conversion cycle is short, the moving speed of the progress bar 301 may be high.

A character indicated by an end of the progress bar 301 may be a selectable character as described above. As the progress bar 301 is moved while the area thereof is increased, the candidate characters may be converted into the selectable character state. A user may check the progress bar 301 and the candidate characters a, b, and c displayed on the display screens 310 and 320, and select a character to be input among the candidate characters a, b, and c.

In the display screens 310 and 320, the candidate character a is indicated by the end of the progress bar 301 and thus the character a is a selectable character. When the input of the button assigned the characters a, b, and c is ended, the selectable character a may be finally input. In the display screen 330, since the candidate character b is indicated by the end of the progress bar 301, the candidate character b is a selectable character. When the input of the button assigned the characters a, b, and c is ended, the selectable character b may be finally input.

When the button assigned the characters a, b, and c is continuously input, the area of the progress bar 301 may increase to a position at which the candidate character c is displayed. After the area of the progress bar 301 is maximized, the progress bar 301 may return to the original state thereof and the area thereof may be increased again from a left end of the display screen 330.

The character inputting apparatus 100 may update the character conversion cycle, based on an amount of time it takes to display the progress bar 301 while the area of the progress bar 301 is increased. In detail, before an input for selecting a selectable character is received, the character inputting apparatus 100 may increase the character conversion cycle, based on the amount of time it takes to display the progress bar 301 while the area of the progress bar 301 is increased. Also, after a selectable character is selected and input, the character inputting apparatus 100 may update the character conversion cycle, based on the amount of time it takes to display the progress bar 301 while the area of the progress bar 301 is increased.

Referring to FIG. 4, as a character input is received, the character inputting apparatus 100 may display display screens 410 to 420. In the display screen 410, as a button assigned characters a, b, and c is input, the characters a, b, and c which are candidate characters may be displayed in a roulette displayed on an upper region of the display screen 410. As the button assigned the characters a, b, and c is continuously input, the roulette may rotate in a direction indicated by an arrow 401. A speed at which the roulette rotates may be determined by a character conversion cycle. That is, when the character conversion cycle is short, the speed at which the roulette rotates may be high.

In the roulette, a character displayed on a lower end of the roulette or a character displayed differently from the other candidate characters is a selectable character as described above. As the roulette rotates in the direction indicated by the arrow 401, the candidate characters a, b, and c may be converted into the selectable character state. A user may check a selectable character in the roulette displayed on the display screen 410, and may select a character to be input among the candidate characters a, b, and c. In addition, the character inputting apparatus 100 may display, on a region of the display screen 410, at least one candidate character 403 that may be displayed in the roulette, so that a user may check the at least one candidate character 403.

In the display screen 410, since the character a is displayed on the lower end of the roulette, the character a is a selectable character. When the input of the button assigned the characters a, b, and c is ended, the selectable character a may be finally input. In the display screen 420, since the character b is displayed on the lower end of the roulette, the character b is a selectable character. When the input of the button assigned the characters a, b, and c is ended, the selectable character b may be finally input.

As the button assigned the characters a, b, and c is continuously input, the roulette may continuously rotate in the direction indicated by the arrow 401 and the candidate characters a, b, and c are sequentially and respectively displayed on surfaces of the roulette. Thus, as the roulette rotates, the candidate characters a, b, and c may be converted into the selectable character state. For example, the candidate characters a, b, and c may be repeatedly disposed on the surfaces of the roulette.

The character inputting apparatus 100 may update the character conversion cycle, based on an amount of time it takes to rotate the roulette. In detail, before an input for selecting a selectable character is received, the character inputting apparatus 100 may increase the character conversion cycle according to the amount of time it takes to rotate the roulette. After a selectable character is selected and input, the character inputting apparatus 100 may update the character conversion cycle according to the amount of time it takes to rotate the roulette.

The progress bar of FIG. 3 and the roulette of FIG. 4 may be displayed to overlap an input window in which a finally selected character is input. The progress bar or the roulette may be displayed to be semi-transparent so that candidate characters and the input window may be checked together.

In addition, various embodiments are not limited to displaying a selectable character in a roulette or a progress bar, and the character inputting apparatus 100 may display a selectable character in the input window in which a character is input. Thus, a selectable character among candidate characters corresponding to user input may be displayed in the input window. A selectable character may be newly selected and displayed in the character conversion cycle. Also, when an input for selecting a selectable character is received, the character inputting apparatus 100 may finally input a character that is selectable at the point in time that the input is received, and display the selectable character in the input window.

Figure 5:
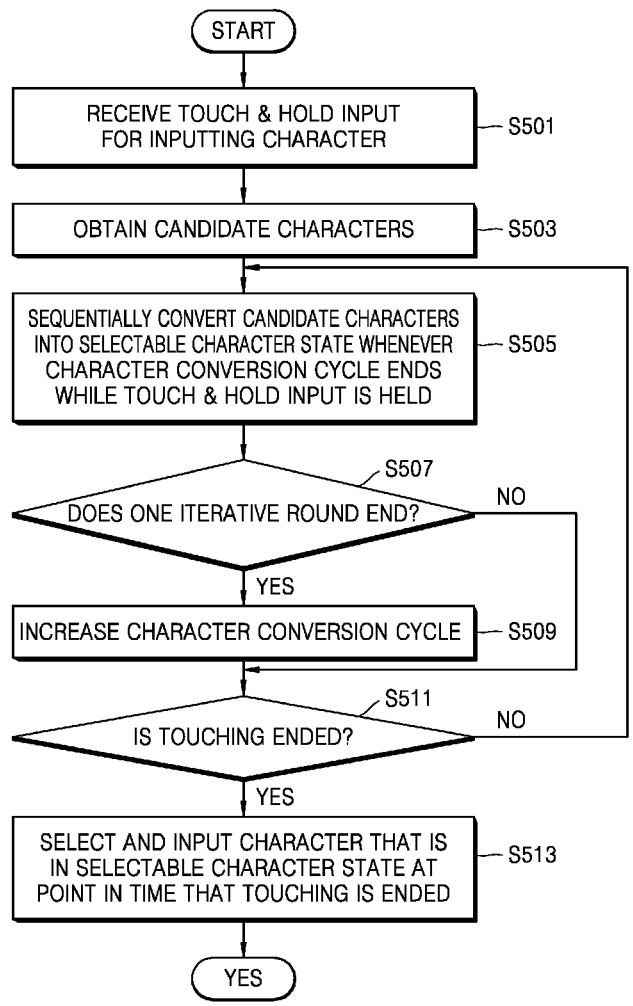
FIG. 5 is a flowchart of a method of inputting a character through a touch input according to an embodiment of the present disclosure.

FIG. 5 is a flowchart of a method of inputting a character through a touch input according to an embodiment of the present disclosure.

Referring to FIGS. 1 and 5, in operation S501, the character inputting apparatus 100 may receive a touch & hold input as user input for inputting a character. For example, when a character input button for inputting a character is displayed on a touch screen, a user may perform a touch & hold input with respect to the character input button.

When a tap input other than the touch & hold input is received, the character inputting apparatus 100 may input a character assigned high priority among a plurality of candidate characters without selecting one of the plurality of candidate characters. Thus, when a tap input is continuously received twice, the character inputting apparatus 100 may sequentially input characters, which are assigned high priority among characters assigned to each of character input buttons for which the tap input is received, in the order in which inputs of the characters assigned high priority are received.

In operation S503, the character inputting apparatus 100 may obtain a plurality of candidate characters corresponding to the touch & hold input received in operation S501. In detail, the character inputting apparatus 100 may obtain a plurality of candidate characters assigned to a character input button for which the touch & hold input is received.

In operation S505, the character inputting apparatus 100 may sequentially convert the plurality of candidate characters into the selectable character state whenever a character conversion cycle ends while the touch & hold input received in operation S501 is held.

An order in which the plurality of candidate characters are converted into the selectable character state may be determined based on preset information or may be updated according to user input or an input history. For example, the order may be determined such that high priority is assigned to characters of high frequency, based a user input history or input information.

The character inputting apparatus 100 may display the states of the plurality of candidate characters on the display screen, and display at least one among the state of a candidate character converted into a selectable character state and the states of the other candidate characters while a touch input is held.

In operation S507, the character inputting apparatus 100 may determine whether an iterative round in which the plurality of candidate characters are sequentially converted into the selectable character state ends. In operation S509, the character inputting apparatus 100 may increase the character conversion cycle when it is determined in operation S507 that the iterative round ends. Until it is determined in operation S511 that the touch input is ended, the character inputting apparatus 100 may increase the character conversion cycle whenever the iterative round ends while the touch input is held.

The character inputting apparatus 100 according to an embodiment may determine the character conversion cycle based on an amount of time it takes to sequentially convert the plurality of candidate characters into the selectable character state. In the embodiment of FIG. 5, the character inputting apparatus 100 may determine the character conversion cycle based on whether an iterative round corresponding to the amount of time it takes ends, and may increase the character conversion cycle by a predetermined value whenever the iterative round ends.

Although a case in which the character inputting apparatus 100 updates the character conversion cycle whenever the iterative round ends has been described in the above embodiment, various embodiments are not limited thereto, and the character conversion cycle may be increased to be proportional to a number of times that the iterative round ends at a point in time when the character conversion cycle is updated.

In operation S513, when it is determined in operation S511 that the touch input is ended, the character inputting apparatus 100 may select and input a character that is selectable at the point in time when the touch input is ended.

Although a case in which user input is received based on a touch & hold input has been described above in the embodiment of FIG. 5, various embodiments are not limited thereto and user input may be received in various ways. That is, the character inputting apparatus 100 may determine candidate characters, and receive user input through various input methods corresponding to an input for converting the candidate characters into the selectable character state and an input for selecting a selectable character.

Figure 6:
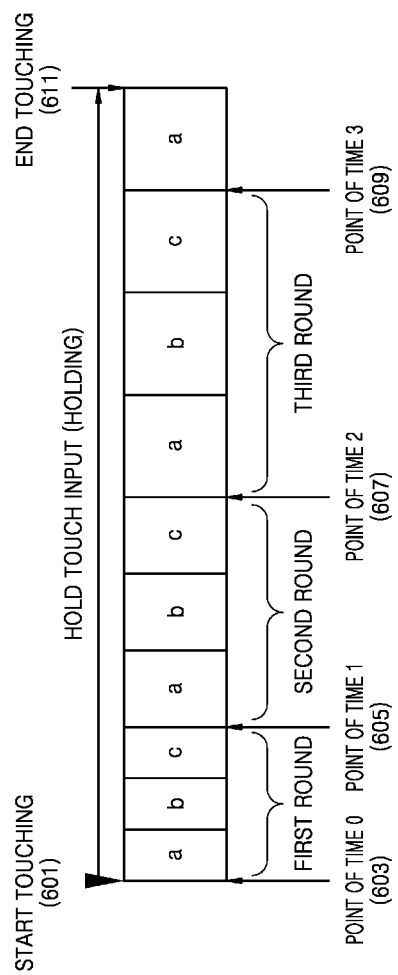
FIG. 6 is a diagram illustrating conversion of a candidate character into a selectable character state according to an embodiment of the present disclosure.

FIG. 6 is a diagram illustrating converting a candidate character into the selectable character state according to an embodiment of the present disclosure.

Referring to FIGS. 1 and 6, when a touch input for inputting a character is received and a plurality of characters are assigned to correspond to the touch input, the character inputting apparatus 100 may select one of the plurality of assigned characters. In order to select one of the plurality of assigned characters, the character inputting apparatus 100 may sequentially convert a plurality of candidate characters, which correspond to an input received while the touch input is held, into the selectable character state. When the touch input is ended, the character inputting apparatus 100 may finally input a character that is selectable at a point in time that the touch input is ended.

Referring to FIG. 6, when a touch input for inputting a character is received, a plurality of candidate characters corresponding to inputs received starting from a point in time 601 may be sequentially converted into the selectable character state. As illustrated in FIG. 6, characters a, b, and c may be sequentially converted into the selectable character state as time goes by. In each of the iterative rounds, the characters a, b, and c may be sequentially converted into the selectable character state. Each of the iterative rounds may be repeated until one of the characters a, b, and c is selected and input.

After the touch input is received, a character conversion cycle may be updated whenever each of the iterative rounds starts, i.e., at first to third points in times 605, 607, and 609 while the touch input is held. After one iterative round is performed, it may be determined that a user is not familiar with a speed at which each of the candidate characters is converted into the selectable character state when the user does not select a character to be input before the same iterative round repeatedly starts, e.g., from a point in time 0 603 to a point in time 1 605, from the point in time 1 605 to a point in time 2 607, or from the point in time 2 607 to a point in time 3 609. Thus, when each of the iterative rounds is repeated, i.e., at the points in time 1 605 to 3 609, the character conversion cycle may be increased to perform character conversion at a low speed.

The character conversion cycle updated at the point in time 1 605 may be applied to converting the candidate characters at the point in time 1 605 to the point in time 2 607. Similarly, the character conversion cycle updated at the point in time 2 607 may be applied to converting the candidate characters at the point in time 2 607 to the point in time 3 609. Also, the character conversion cycle updated at the point in time 3 609 may be applied to converting the candidate characters after the point in time 3 609.

The character inputting apparatus 100 may update the character conversion cycle, based on an amount of time it takes to convert the candidate characters. For example, the character inputting apparatus 100 may update the character conversion cycle according to an amount of time it takes to convert the candidate characters or a number of times that each of the iterative rounds is repeated, starting from a point in time that the character conversion cycle is updated. In other words, the character inputting apparatus 100 may increase the character conversion cycle to be proportional to the amount of time it takes to convert the candidate characters or the number of times that each of the iterative rounds is repeated.

At the point in time 1 605, the character conversion cycle may be increased to be proportional to an amount of time it takes to convert the candidate characters from the point in time 0 603 to the point in time 1 605 or the number of times that each of the iterative rounds is repeated. At the point in time 2, the character conversion cycle may be increased to be proportional to an amount of time it takes to convert the candidate characters to the point in time 2 607 from the point in time 0 603 or the point in time 1 605 or the number of times that each of the iterative rounds is repeated. At the point in time 3, the character conversion cycle may be increased to be proportional to an amount of time it takes to convert the candidate characters to the point in time 2 607 from one of the point in time 0 603, the point in time 1 605, and the point in time 2 607 or the number of times that each of the iterative rounds is repeated.

Thereafter, when one of the candidate characters is selected according to user input, the character inputting apparatus 100 may input the selected character. For example, the character inputting apparatus 100 may select and input a character that is selectable at a character selection input is received. Referring to FIG. 6, the character a which is selectable at a point in time 611 at which the touch input is ended may be finally selected and input.

Figure 7:
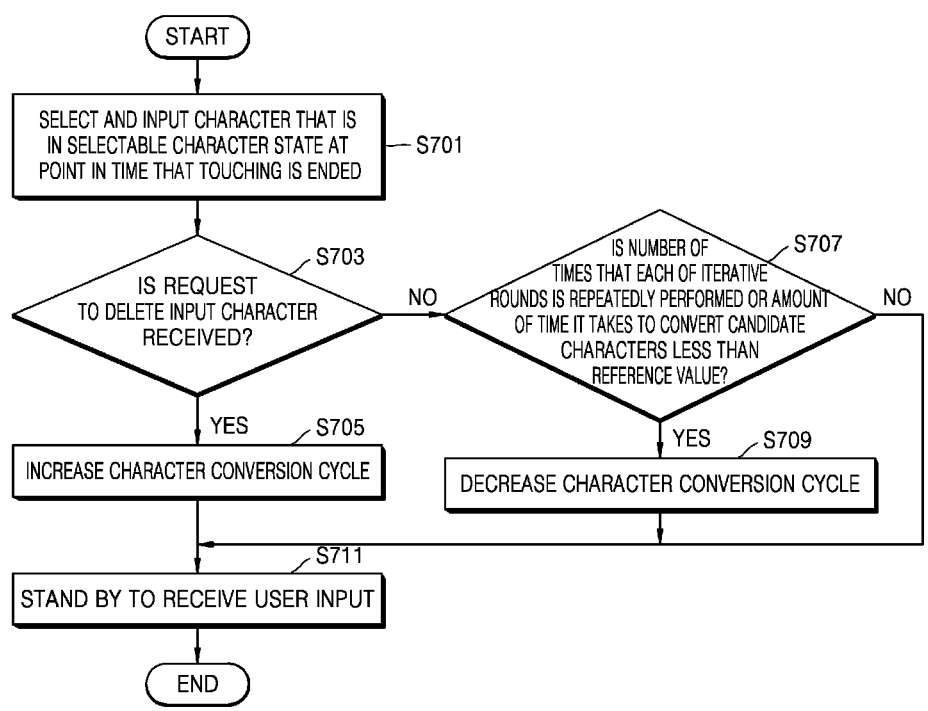
FIG. 7 is a flowchart of a method of updating a character conversion cycle based on a character input history according to an embodiment of the present disclosure.

FIG. 7 is a flowchart of updating a character conversion cycle based on a character input history according to an embodiment of the present disclosure.

Referring to FIGS. 1 and 7, in operation S701, when touching is ended, the character inputting apparatus 100 may select and input a character that is selectable at a point in time that the touching is ended. In detail, when a plurality of candidate characters are converted into the selectable character state in the character conversion cycle according to a touch & hold input and then the touch & hold input is ended, the character inputting apparatus 100 may select and input a character that is selectable at a point in time that the touch & hold input is ended. Operation S701 may correspond to operation S513 of FIG. 5.

Although a case in which user input is received through a touch & hold input in the embodiment of FIG. 7, various embodiments are not limited thereto and user input may be received in various ways. That is, the character inputting apparatus 100 may determine candidate characters, and receive user input in various ways that may correspond to an input for converting the candidate characters into the selectable character state and an input for selecting a selectable character. That is, in operation S701, the character inputting apparatus 100 may select and input a selectable character according to user input received through various methods, in addition to the touch & hold input.

In operation S703, the character inputting apparatus 100 may determine whether a request to delete the character input in operation S701 is received. When a user requests to delete an input character, it may be understood that the user is inexperienced in manipulation for selecting a character to be input among candidate characters converted into the selectable character state in the character conversion cycle.

Thus, in operation S705, when it is determined in operation S703 that a request to delete the character that is input in operation S701 is received, the character inputting apparatus 100 may increase the character conversion cycle. As the character conversion cycle increases, a speed at which the candidate characters are converted into the selectable character state becomes low. Thus, a user may be able to easily select a character to be input.

In addition, in operation S705, the character inputting apparatus 100 may increase the character conversion cycle, taking further into account a number of times that each of iterative rounds is repeated. In detail, the character inputting apparatus 100 may increase the character conversion cycle to be proportional to a number of times that each of the iterative rounds in which candidate characters corresponding to user input are sequentially converted into the selectable character state is repeated. Otherwise, the character inputting apparatus 100 may increase the character conversion cycle to be proportional to an amount of time it takes to sequentially convert the candidate characters into the selectable character state until the character is selected and input in operation S701.

Referring to FIG. 6, in operation S705, the character inputting apparatus 100 may increase the character conversion cycle to be proportional to an amount of time it takes to perform touching from the point in time 0 603 to the point in time 611 or '3' which is a number of times that each of the iterative rounds is repeated.

When the amount of time it takes to sequentially convert the candidate characters into the selectable character state or the number of times that each of the iterative rounds is repeated is long, it may be determined that a user is inexperienced in manipulation for inputting a character. In this case, the character inputting apparatus 100 may increase the character conversion cycle in operation S705 so as to decrease a speed at which each of the candidate characters is converted into the selectable character state, so that a user may be able to more easily select a character to be input.

In operation S707, when it is determined in operation S703 that a request to delete the character that is input in operation S701 is not received, the character inputting apparatus 100 may determine whether the number of times that each of the iterative rounds is repeated or the time it takes to convert the candidate characters is less than a reference value. When a request to delete the input character is not received, it may be determined that a user successfully inputs a desired character. When the number of times that each of the iterative rounds is repeated or the amount of time it takes to convert the candidate characters is less than the reference value, it may be determined that a user is experienced in selecting a character to be input in the character conversion cycle.

Thus, in operation S709, the character inputting apparatus 100 may decrease the character conversion cycle when a request to delete the input character is not received and when the number of times that each of the iterative rounds is repeated or the amount of time it takes to convert the candidate characters is less than the reference value. When the character conversion cycle decreases, an amount of time it takes for the character inputting apparatus 100 to input a character may further decrease. Thus, when a user is experienced in manipulation for inputting a character, the character inputting apparatus 100 may adjust the character conversion cycle such that an amount of time it takes to input a character decreases.

Referring to FIG. 6, it is assumed that the character conversion cycle may be decreased when the number of times that each of the iterative rounds is repeated is less than or equal to '0'. In this case, when the touching is ended before a first iterative round ends, i.e., before the point in time 1 605 ends, the number of times that each of the iterative rounds is '0'. Thus, the character inputting apparatus 100 may decrease the character conversion cycle in operation S709.

Although a request to delete the input character is not received, when the number of times that each of the iterative rounds is repeated or the amount of time it takes to convert the candidate characters is equal to or greater than the reference value, it may be determined that it takes a large amount of time for a user to select a character to be input among the characters converted into the selectable character state. In this case, the character inputting apparatus 100 may determine that a user is inexperienced in manipulation for inputting a character and may not thus adjust the character conversion cycle, or may update the character conversion cycle based on the number of times that each of the iterative rounds is repeated or the amount of time it takes to convert the candidate characters.

In operation S711, the character inputting apparatus 100 may stand by to receive user input. Thereafter, when user input for inputting a character is received, the candidate characters may be converted into the selectable character state in the character conversion cycle updated in operation S705 or S709.

Figure 8:
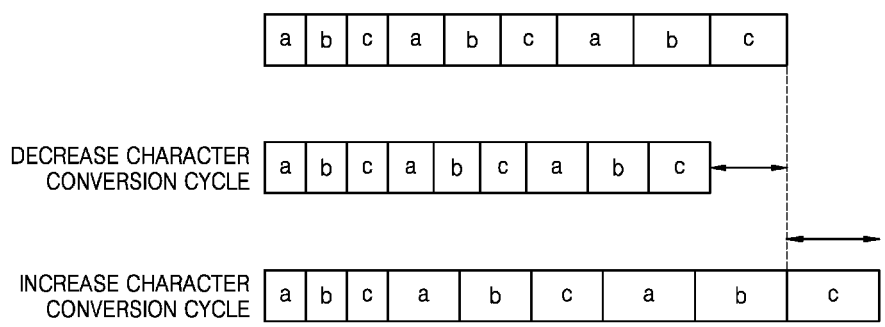
FIG. 8 is a diagram illustrating increase or decrease of a character conversion cycle according to an embodiment of the present disclosure.

FIG. 8 is a diagram illustrating increasing or decreasing a character conversion cycle according to an embodiment of the present disclosure. In detail, FIG. 8 illustrates converting characters in a character conversion cycle updated based on a character input history after a character is input as described above with reference to FIG. 7.

Referring to FIG. 8, when the character conversion cycle is decreased based on the character input history, an amount of time it takes to convert each of the candidate characters into the selectable character state decreases in each of iterative rounds. Thus, an amount of time it takes to repeatedly perform each of the iterative rounds may also decrease.

When the character conversion cycle is increased based on the character input history, an amount of time it takes to convert each of the candidate characters into the selectable character state increases in each of iterative rounds. Thus, an amount of time it takes to repeatedly perform each of the iterative rounds may also increase.

Figure 9:
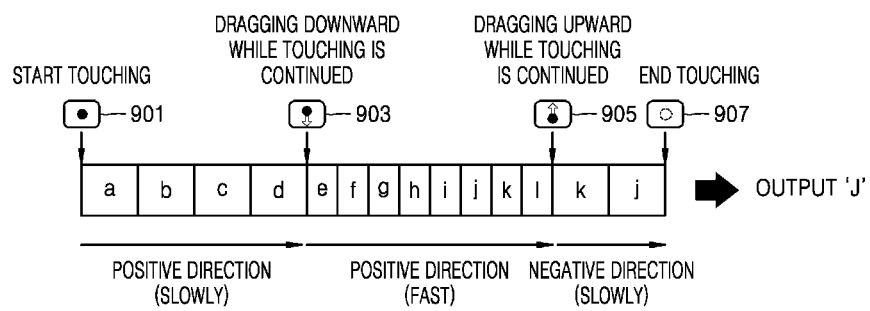
FIG. 9 is a diagram illustrating adjustment of a character conversion cycle according to a user input according to an embodiment of the present disclosure.

FIG. 9 is a diagram illustrating adjusting a character conversion cycle according to user input according to an embodiment of the present disclosure.

Referring to FIG. 9, when a user touches 901 a character input button for inputting a character, candidate characters for inputting a character may be displayed on a touch screen. While the touch input is held, the candidate characters assigned to the character input button touched by the user may be converted into the selectable character state in a positive direction in a character conversion cycle. The converted characters may be displayed on the touch screen or output according to various output methods.

When a drag input is input in a state in which the touch input is held, the character inputting apparatus 100 may change the character conversion cycle and a character conversion direction according to the drag input. In detail, as illustrated in FIG. 9, while the touch input is held and the candidate characters are converted into the selectable character state, when a downward drag input 903 is input, the character conversion cycle may be adjusted based on a moving distance according to the downward drag input 903. For example, when the moving distance according to the downward drag input 903 is long, the character conversion cycle may be adjusted to be short. When an upward drag input 905 is input while the candidate characters are converted into the selectable character state, the character conversion cycle may be adjusted based on a moving distance according to the upward drag input 905 and the character conversion direction may be changed into a negative direction. For example, when the moving distance according to the upward drag input 905 is long, the character conversion cycle may be adjusted to be long and the characters may be converted in an order opposite the order in which the characters are converted until a point in time that the upward drag input 905 is input.

Here, the positive direction may be understood as a predetermined order of candidate characters assigned to a character input button, and the negative direction may be understood as an order opposite the positive direction. The order of candidate characters assigned to each of buttons may be predetermined according to user input or initial setting information. Otherwise, the order of candidate characters may be automatically determined based on a user input history.

The downward drag input 903 may be input when a user is experienced in manipulation for inputting a character and thus character conversion cycle is adjusted to be short. In contrast, the upward drag input 905 may be input when a user is inexperienced in manipulation for inputting a character and thus character conversion cycle is adjusted to be long or when candidate characters converted in a previous iterative round are checked again.

Although the above embodiment has been described with respect to a downward drag input and an upward drag input, various embodiments are not limited thereto and a character conversion cycle and a character conversion direction may be changed according to various-direction drag inputs. Also, various embodiments are not limited to drag inputs, and the character conversion cycle and the character conversion direction may be changed according to various input methods corresponding to an input for changing the character conversion cycle or the character conversion direction.

When the touch input is ended 907, the character inputting apparatus 100 may finally input 'j' which is a character that is selectable at a point in time that the touching of the character input button is ended.

Figure 10:
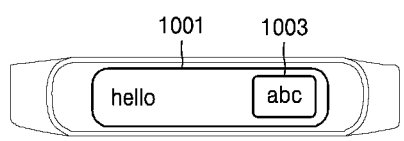
FIG. 10 is a diagram illustrating a character input button employed in a character input method according to an embodiment of the present disclosure.

FIG. 10 is a diagram illustrating a character input button employed in a character input method according to an embodiment of the present disclosure.

Referring to FIGS. 1 and 10, the character inputting apparatus 100 may include at least one input window 1001 for displaying an input character, and at least one character input button 1003. When the character inputting apparatus 100 is a smart watch having a display screen or when the character inputting apparatus 100 has a small size, the number of the at least one character input button 1003 to be displayed on the display screen or included in the character inputting apparatus 100 may be small. Thus, when the number of the at least one character input button 1003 is one or a small number, the number of candidate characters to be assigned to each of the character input button 1003 is large. Thus, it may take a large amount of time to select a character to be input.

According to an embodiment of the present disclosure, even if a large number of candidate characters are assigned to the at least one character input button 1003 and thus it takes a large amount of time to convert the character, which is to be input, into the selectable character state, a character conversion cycle may be adjusted according to user input, thereby comparatively reducing an amount of time it takes to input a character.

When an order in which candidate character are converted into the selectable character state is sufficiently predictable to a user, the character inputting apparatus 100 may increase the character conversion cycle according to user input until a character that is to be input or a character adjacent to the character that is to be input is converted into the selectable character state. The character inputting apparatus 100 may access a character to be input by decreasing the character conversion cycle according to user input or changing an order in which the characters are converted, at a point in time that the character to be input or a character adjacent to the character to be input is converted into the selectable character state.

Thus, the character inputting apparatus 100 may minimize an amount of time it takes to input a character by adjusting the character conversion cycle and a character conversion direction according to user input even when a large of candidate characters are assigned to each of buttons.

According to an embodiment of the present disclosure, when an input of tapping the at least one character input button 1003 is received, the character inputting apparatus 100 may change the characters assigned to the at least one character input button 1003. For example, when an input of tapping the at least one character input button 1003 is received, the character inputting apparatus 100 may switch characters a, b, and c assigned to the character input button 1003 to characters d, e, and f, and display the characters d, e, and f on the character input button 1003. Thereafter, when an input of tapping the character input button 1003 is received again, the character inputting apparatus 100 may switch the characters d, e, and f assigned to the character input button 1003 to characters g, h, and i, and display the characters g, h, and i on the character input button 1003.

Figure 11A:
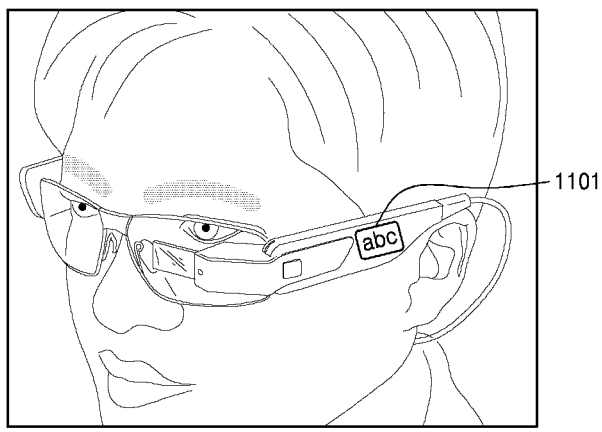
FIGS. 11A, 11B, and 11C illustrate examples of a character input button of a character inputting apparatus according to various embodiments of the present disclosure.
Figure 11B:
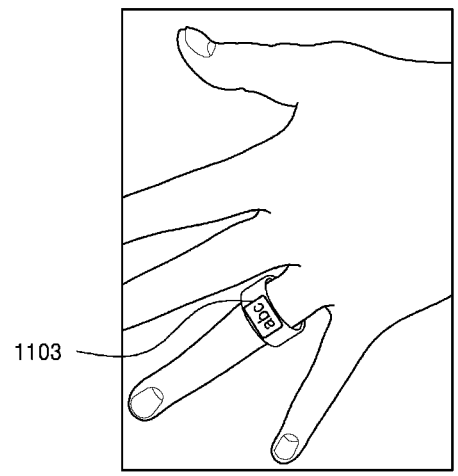
Figure 11C:
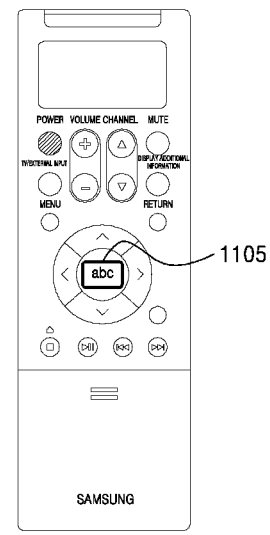

FIGS. 11A to 11C illustrate examples of a character input button of the character inputting apparatus 100 of FIG. 1 according to various embodiments of the present disclosure.

Referring to FIGS. 11A to 11C, when the character inputting apparatus 100 is smart glasses, a smart ring, or a remote control, it may be difficult to install a plurality of character input buttons 1101, 1103, and 1105 for receiving user input in the character inputting apparatus 100 due to a limited space of the character inputting apparatus 100. When the number of the character input buttons 1101, 1103, and 1105 is small, the number of candidate characters to be assigned to each of the character input buttons 1101, 1103, and 1105 is large and thus it may take a large amount of time to input a character. However, the character inputting apparatus 100 may adjust a character conversion cycle according to user input. Thus, even when the number of candidate characters to be assigned to each of the character input buttons 1101, 1103, and 1105 is large, the character inputting apparatus 100 may minimize an amount of time it takes to input a character.

Figure 12:
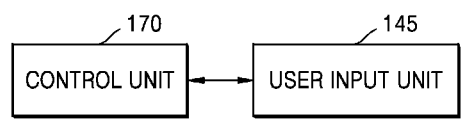
FIGS. 12 and 13 are block diagrams of structures of character inputting apparatuses according to various embodiments of the present disclosure.
Figure 13:
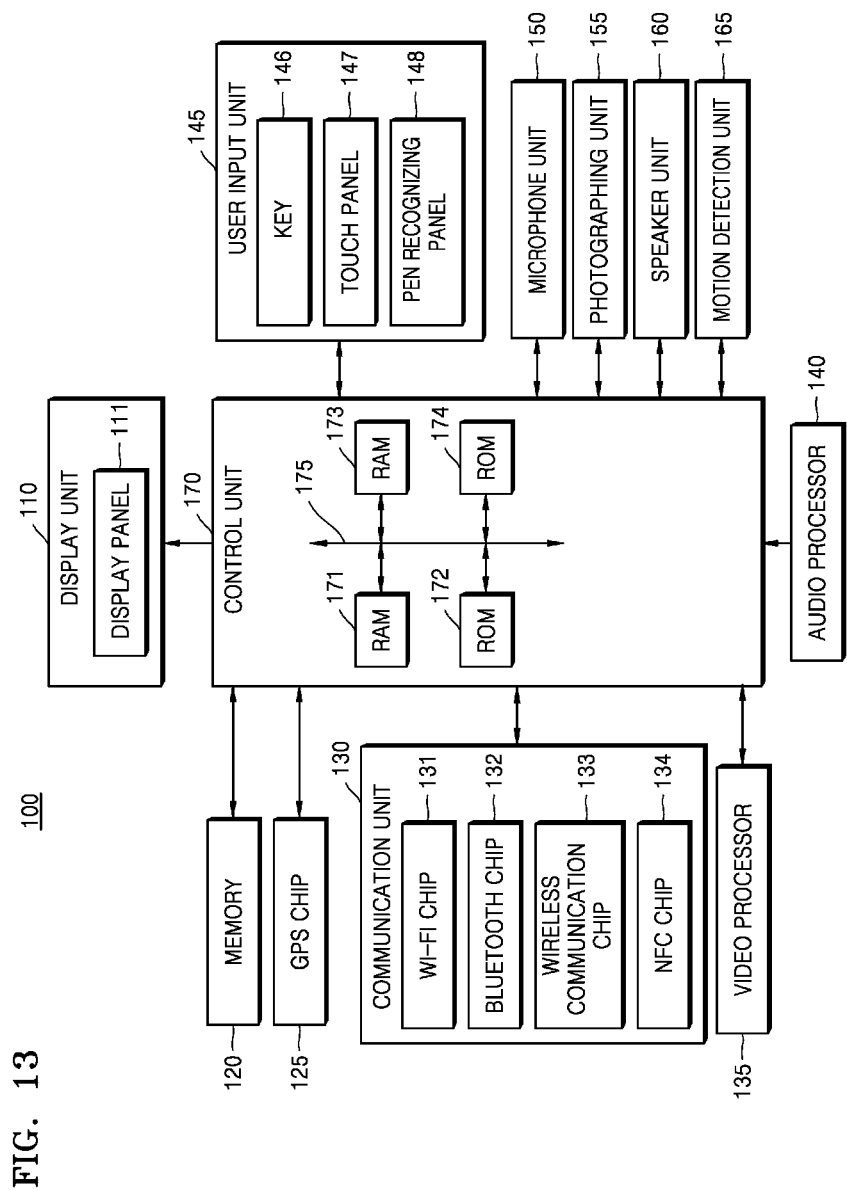

FIGS. 12 and 13 are block diagrams of the structures of character inputting apparatuses 100 according to various embodiments of the present disclosure.

Referring to FIGS. 12 and 13, the structure of the character inputting apparatus 100 is applicable to various types of devices, such as a mobile phone, a tablet PC, a PDA, an MP3 player, a kiosk, an electronic picture frame, a navigation device, a digital TV, a wearable device (e.g., a wrist watch, a smart ring, or a head-mounted display (HMD)), a TV remote control, etc.

As illustrated in FIG. 12, the character inputting apparatus 100 according to an embodiment may include a control unit 170 and a user input unit 145. However, all of these elements are not indispensable elements. The character inputting apparatus 100 may further include more elements and only one of the control unit 170 and the user input unit 145.

For example, as illustrated in FIG. 13, the character inputting apparatus 100 according to another embodiment may include a user input unit 145 and a control unit 170, and may further include a display unit 110, a memory 120, a global positioning system (GPS) chip 125, a communication unit 130, a video processor 135, an audio processor 140, a microphone 150, an imaging unit 155, a speaker unit 160, a motion sensor 165, etc.

These components will be sequentially described below.

The display unit 110 may include a display panel 111, and a controller (not shown) configured to control the display panel 111. The display panel 111 may be embodied as various types of displays, e.g., a liquid crystal display (LCD), an organic light-emitting diode (OLED) display, an active-matrix OLED (AM-OLED), a plasma display panel (PDP), etc. The display panel 111 may be embodied to be flexible, transparent, or wearable. The display unit 110 may be combined with a touch panel 147 of the user input unit 145 to form a touch screen (not shown). For example, the touch screen may include an integral type module in which the display panel 111 and the touch panel 147 are stacked together.

The display unit 110 according to an embodiment may display candidate characters corresponding to a received input, and a character that is in the selectable character state.

Although not shown, the memory 120 may include at least one of an internal memory and an external memory.

The internal memory may include, for example, at least one among a volatile memory (e.g., dynamic random access memory (DRAM), a static RAM (SRAM), a synchronous DRAM (SDRAM), etc.), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, etc.), a hard disk drive (HDD), a solid-state drive (SSD), etc. According to an embodiment of the present disclosure, the control unit 170 may process a command or data received from at least one among a nonvolatile memory and other elements by loading the command or the data to the volatile memory. Also, the control unit 170 may store, in the nonvolatile memory, data received from or generated by another element.

The external memory may include, for example, at least one among a compact flash (CF) memory, a secure digital (SD) memory, a micro-SD memory, a mini-SD memory, an extreme digital (xD) memory, and a memory stick.

The memory 120 may store various programs and data for operating the character inputting apparatus 100. For example, the memory 120 may temporarily or semi-permanently store at least a part of character information received according to user input. Also, the memory 120 may store a programming module, such as the programming module discussed below with reference to FIG. 14.

The control unit 170 may control the display unit 110 to display the at least one part of the character information stored in the memory 120. In other words, the control unit 170 may control the at least one part of the character information stored in the memory 120 to be displayed on the display unit 110. Otherwise, when a user's gesture is performed on a region of the display unit 110, the control unit 170 may perform a control operation corresponding to the user's gesture.

The control unit 170 according to an embodiment may sequentially convert candidate characters corresponding to a received input into the selectable character state whenever a predetermined character conversion cycle ends. Also, before user input for selecting a selectable character is received, the control unit 170 may update the character conversion cycle, based on an amount of time it takes to sequentially convert the plurality of candidate characters into the selectable character state. In addition, the control unit 170 may change the character conversion cycle and a character conversion direction according to user input, e.g., a drag input. Also, the control unit 170 may update the character conversion cycle, based on a user's character input history, e.g., an amount of time it takes to input a character or whether an input character is to be deleted. The control unit 170 may sequentially convert the candidate characters into the selectable character state whenever the updated character conversion cycle ends.

In addition, while an application is run, the control unit 170 may control a user interface (UI) screen configured to receive user input to be displayed on the display unit 110 so as to perform a character input operation according to an embodiment of the present disclosure. For example, as illustrated in FIG. 1, 3, or 4, in the character inputting apparatus 100, a UI screen for performing the character input operation may be displayed on the display unit 110. The UI screen for performing the character input operation may be displayed on the display unit 110 when an application requiring the character input operation is run. The application requiring the character input operation may include, for example, a mobile messenger application, an application for sending a short messaging service (SMS) text or a multimedia messaging service (MMS) text, an application for writing a memo, etc. The character inputting apparatus 100 may receive user input through the UI screen for performing the character input operation according to an embodiment of the present disclosure, and perform a work of an application that is being run, based on the user input.

The control unit 170 may include at least one among a RAM 171, a ROM 172, a central processing unit (CPU) 173, a graphical processing unit (GPU) 174 and a bus 175. The RAM 171, the ROM 172, the CPU 173, the GPU 174, etc. may be connected to one another via the bus 175.

The CPU 173 accesses the memory 120, and performs system booting using an operating system (O/S) stored in the memory 120. Also, the CPU 173 may perform various operations using various programs, contents, data, etc. stored in the memory 120.

The ROM 172 stores command sets for booting the system. For example, when a turn-on command is input and power is supplied to the character inputting apparatus 100, the CPU 173 may copy the O/S stored in the memory 120 to the RAM 171, and run the O/S to boot the system according to a command stored in the ROM 172. When the booting of the system is completed, the CPU 173 performs various operations by copying various programs stored in the memory 120 to the RAM 171 and running the copied programs. When the character inputting apparatus 100 is booted, the GPU 174 displays the UI screen on a region of the display unit 110. In detail, the GPU 174 may create a screen including various objects such as contents, icons, menus, etc. The GPU 174 calculates attribute values (e.g., coordinates, a shape, a size, colors, etc.) of each of the objects to be displayed, based on a layout of the screen. The GPU 174 may create screens having various layouts including objects, based on the calculated attribute values. The screens created by the GPU 174 may be provided to the display unit 110 and displayed on regions of the display unit 110.

The GPS chip 125 may receive a GPS signal from a GPS satellite and calculate a current position of the character inputting apparatus 100 based on the GPS signal. The control unit 170 may calculate a user's position by using the GPS chip 125 when a navigation program is used or when the user's current position is required.

The communication unit 130 may establish communication with various types of external devices according to various communication methods. The communication unit 130 may include at least one among a Wi-Fi chip 131, a Bluetooth chip 132, a wireless communication chip 133, and a near-field communication (NFC) chip 134. The control unit 170 may establish communication with various types of external devices through the communication unit 130. For example, the control unit 170 may receive a character input request from an external device via the communication unit 130, and transmit a result of inputting a character to the external device.

The Wi-Fi chip 131 and the Bluetooth chip 132 may establish communication according to a Wi-Fi method and a Bluetooth method, respectively. When the Wi-Fi chip 131 or the Bluetooth chip 132 is used, various connection information such as a segment identifier (SID), a session key, etc. may be transmitted or received, communication may be established based on the various connection information, and then various information may be transmitted or received. The wireless communication chip 133 is a chip for establishing communication according to various communication standards, e.g., IEEE, zigbee, 3rd generation (3G), a 3rd generation partnership project (3GPP), long-term evolution (LTE), etc. The NFC chip 134 is a chip operating in an NFC manner at 13.56 MHz among various radio-frequency (RF)-ID frequencies, e.g., 135 kHz, 13.56 MHz, 433 MHz, 860 to 960 MHz, 2.45 GHz, etc.

The video processor 135 may process video data included in a content received via the communication unit 130 or a content stored in the memory 120. The video processor 135 may perform various image processing (e.g., decoding, scaling, noise filtering, frame rate conversion, resolution conversion, etc.) on the video data. For example, when a content is reproduced according to user input received through a character input operation, the video processor 135 may reproduce the content by processing video data included in the content.

The audio processor 140 may process audio data included in a content received via the communication unit 130 or a content stored in the memory 120. The audio processor 140 may perform various image processing (e.g., decoding, amplification, noise filtering, etc.) on the audio data. For example, the audio processor 140 may process the audio data to output voice or a sound effect representing a character converted into the selectable character state or a finally selected character.

When a reproduction program is run with respect to a multimedia content, the control unit 170 may drive the video processor 135 and the audio processor 140 to reproduce the multimedia content. For example, in the character inputting apparatus 100, the control unit 170 may drive the video processor 135 and the audio processor 140 to reproduce the multimedia content according to user input received through a character input operation for requesting the multimedia content to be reproduced. The speaker unit 160 may output audio data generated by the audio processor 140.

The user input unit 145 may receive various commands from a user. The user input unit 145 may include at least one among a key 146, a touch panel 147, and a pen recognition panel 148. The character inputting apparatus 100 may input a character according to user input received from at least one among the key 146, the touch panel 147, and the pen recognition panel 148.

The key 146 may include various types of keys (e.g., mechanical buttons, wheels, etc.) which are formed on various regions (e.g., a front surface, a side surface, a rear surface, etc.) of a main body of the character inputting apparatus 100.

The touch panel 147 may sense a user's touch input and output a touch event value corresponding to the sensed touch input. When the touch panel 147 is combined with the display panel 111 to form a touch screen (not shown), the touch screen may be embodied as various types of touch sensors, e.g., an electrostatic touch sensor, a pressure-sensitive touch sensor, a piezoelectric touch sensor, etc. The electrostatic touch sensor includes a dielectric material coated on a surface of a touch screen in order to sense a small amount of electricity generated by a user's body when a part of the user's body touches the touch screen at a certain location and calculate the coordinates of the touched location. The pressure-sensitive touch sensor includes two upper and lower electrode plates embedded in the touch screen. When the touch screen is touched by a user at the certain location, the upper and lower electrode plates are in contact with each other and current flows at the touched location. The pressure-sensitive touch sensor senses the current and calculates the coordinates of the touched location. A touch event may be generated on a touch screen mainly by a human finger but may be generated by a conductive object in which an electrostatic capacitance change may occur.

The pen recognition panel 148 may sense a proximity input or a touch input performed by a user's touch pen (e.g., a stylus pen, a digitizer pen, etc.), and output a pen proximity event or a pen touch event. The pen recognition panel 148 may employ, for example, an electromagnetic resonance (EMR) method, and may sense a touch or proximity input, based on a change in the intensity of a magnetic field, caused when a pen is moved to approach or touch a touch screen. In detail, although not shown, the pen recognition panel 148 may include a grid-type electromagnetic induction coil sensor, and an electronic signal processor configured to sequentially supply an alternate-current (AC) signal having a specific frequency to loop coils of the electromagnetic induction coil sensor. In the pen recognition panel 148, when a pen including a resonance circuit therein is disposed near the loop coils, a magnetic field transmitted from the loop coils generates current in the resonance circuit included in the pen through mutual electromagnetic induction. An induction magnetic field is generated from the current in a coil of the resonance circuit included in the pen. The pen recognition panel 148 may sense a location on a touch screen approached or touched by the pen by detecting the induction magnetic field in the loop coil that is in a signal reception state. The pen recognition panel 148 may be provided to occupy a certain area of the bottom of the display panel 111, e.g., so as to cover a display region of the display panel 111.

The microphone 150 may receive a user's voice or sound and convert it into audio data. The control unit 170 may control a user's voice that is input via the microphone 150 to be used during a calling operation or a character input operation or to be converted into audio data and stored in memory 120.

The imaging unit 155 may capture a still image or video under a user's control. A plurality of the imaging units 155, e.g., a front camera and a rear camera, may be provided.

When the imaging unit 155 and the microphone 150 are prepared, the control unit 170 may perform a control operation according to a user's voice that is input via the microphone 150 or the user's motion recognized by the imaging unit 155. For example, the character inputting apparatus 100 may operate in a motion-controlled mode or a voice-controlled mode. When the character inputting apparatus 100 operates in the motion-controlled mode, the control unit 170 may activate the imaging unit 155 to photograph a user, trace a change in the user's motion, and perform a control operation corresponding to a result of tracing the change in the user's motion. For example, the control unit 170 may perform a character input operation according to a user's motion sensed by the imaging unit 155. When the character inputting apparatus 100 operates in the voice-controlled mode, the control unit 170 may analyze a user's voice that is input via the microphone 150 and operate in a voice recognition mode in which a control operation is performed according to a result of analyzing the user's voice. For example, the control unit 170 may analyze a user's voice that is input via the microphone 150 and perform a character input operation according to a result of analyzing the user's voice.

The motion sensor 165 may sense a movement of the main body of the character inputting apparatus 100. The character inputting apparatus 100 may rotate or be tilted in various directions. In this case, the motion sensor 165 may sense characteristics of the movement (e.g., a rotation direction, an angle, an inclination, etc.) of the main body of the character inputting apparatus 100 by using at least one among various sensors, e.g., a terrestrial magnetism sensor, a gyro sensor, an acceleration sensor, etc. For example, the motion sensor 165 may receive user input by sensing the movement of the main body of the character inputting apparatus 100, and perform a character input operation based on the user input.

Although not shown, in the various embodiments of FIGS. 12 and 13, the character inputting apparatus 100 may further include a universal serial bus (USB) sensor to which a USB connector may be connected, various external input ports to which various external terminals (e.g., a headset, a mouse, a local area network (LAN) terminal, etc.) may be connected, a digital multimedia broadcasting (DMB) chip for receiving and processing a DMB signal, various sensors, etc. The character inputting apparatus 100 may receive a request to input a character from an external device and a result of inputting a character to the external device via the various external input ports. Also, the character inputting apparatus 100 may receive user input for inputting a character via various sensors.

The names of the components of the character inputting apparatus 100 described above are variable. Also, the character inputting apparatus 100 set forth herein may be configured with at least one among the components described above, and may include only some of the components or may further include other components.

According to an embodiment of the present disclosure, when a plurality of characters are assigned to one key or a touch region, a character to be input may be selected from among the plurality of characters and input without having to receive a plurality of inputs.

According to an embodiment of the present disclosure, when a plurality of characters are assigned to one key or a touch region, a character to be input may be selected from among the plurality of characters by taking into account a user's manipulation history, so that the user may more easily select and input a character.

A method according to an embodiment of the present disclosure can be embodied as computer readable code in a non-transitory computer readable medium. Here, the non-transitory computer readable medium may be any recording apparatus capable of storing data that is read by a computer system (including all of devices having an information processing function), e.g., a ROM, a RAM, a compact disc (CD)-ROM, a magnetic tape, a floppy disk, an optical data storage device, and so on.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of inputting a character in an apparatus, the method comprising:
    obtaining a plurality of candidate characters for inputting a character;
    sequentially converting at least one candidate character from among the plurality of candidate characters into a selectable character state according to a character conversion cycle;
    receiving a user input for selecting the character from among the at least one candidate character of the selectable character state;
    inputting the selected character on the apparatus, according to the user input; and
    updating the character conversion cycle based on an amount of time it takes to receive the user input for selecting the character while the plurality of candidate characters are sequentially converted into the selectable character state according to the character conversion cycle,
    wherein, when an iterative round in which the plurality of candidate characters are sequentially converted into the selectable character state is repeated, the updating of the character conversion cycle comprises updating the character conversion cycle whenever the iterative round starts, and
    wherein, until the user input for selecting the character is received, the updating of the character conversion cycle comprises updating the character conversion cycle whenever the iterative round starts, based on a number of times that the iterative round is repeated.

2. The method of claim 1,
    wherein the user input for selecting the character is a touch input,
    wherein, while the touch input is held, the plurality of candidate characters are sequentially converted into the selectable character state according to the character conversion cycle, and
    wherein, when the touch input is ended, the character that is the selectable character state at a point in time when the touch input is ended is selected and input.

3. The method of claim 2, further comprising:
    receiving a drag input while the touch input is held; and
    determining, based on the drag input, at least one of the character conversion cycle and a character conversion direction representing an order in which the candidate characters are converted into the selectable character state.

4. The method of claim 1, further comprising:
    updating the character conversion cycle based on at least one of whether the selected character is to be deleted and an amount of time it takes to select the selectable character, starting from a predetermined point in time.

5. The method of claim 4, wherein the updating of the character conversion cycle comprises decreasing the character conversion cycle, based on at least one of a case in which the selected character is not deleted and a case in which the amount of time it takes to select the character starting from a predetermined point in time is less than a reference value.

6. The method of claim 4, wherein the updating of the character conversion cycle comprises increasing the character conversion cycle based on at least one of a case in which the selected character is deleted and a case in which the amount of time it takes to select the character starting from a predetermined point in time is equal to or greater than a reference value.

7. A non-transitory computer-readable recording medium having recorded thereon a program that when executed by at least one processor causes the at least one processor to control the performance of the method of claim 1.

8. An apparatus for inputting a character, the apparatus comprising:
    a user input interface configured to receive a user input for selecting a character from among at least one candidate character of a selectable character state; and
    at least one processor configured to:
        obtain a plurality of candidate characters for inputting the character,
        sequentially convert the at least one candidate character from among the plurality of candidate characters into the selectable character state according to a character conversion cycle ends,
        inputs the selected character on the apparatus, according to the user input,
        update the character conversion cycle based on an amount of time it takes to receive the user input for selecting the character while the plurality of candidate characters are sequentially converted into the selectable character state according to the character conversion cycle,
    wherein, when an iterative round in which the plurality of candidate characters are sequentially converted into the selectable character state is repeated, the at least one processor is further configured to update the character conversion cycle whenever the iterative round starts, and
    wherein, until the user input for selecting the character is received, the at least one processor is further configured to update the character conversion cycle whenever the iterative round starts, based on a number of times that the iterative round is repeated.

9. The apparatus of claim 8,
wherein the user input for selecting the character is a touch input,
wherein, while the touch input is held, the plurality of candidate characters are sequentially converted into the selectable character state according to the character conversion cycle, and
wherein, when the touch input is ended, the character that is in the selectable character state at a point in time when the touch input is ended is selected and input.

10. The apparatus of claim 9,
wherein the user input interface is further configured to receive a drag input while the touch input is held, and
wherein the at least one processor is further configured to determine, based on the drag input, at least one of the character conversion cycle and a character conversion direction representing an order in which the candidate characters are converted into the selectable character state.

11. The apparatus of claim 8,
wherein the at least one processor is further configured to update the character conversion cycle based on at least one of whether the selected character is to be deleted and an amount of time it takes to select the character, starting from a predetermined point in time.

12. The apparatus of claim 11, wherein the at least one processor is further configured to decrease the character conversion cycle based on at least one of a case in which the selected character is not deleted and a case in which the amount of time it takes to select the character starting from a predetermined point in time is less than a reference value.

13. The apparatus of claim 11, wherein the at least one processor is further configured to increase the character conversion cycle based on at least one of a case in which the selected character is deleted and a case in which the amount of time it takes to select the character starting from a predetermined point in time is equal to or greater than a reference value.

* * * * *